United States Patent
Bhargava et al.

(10) Patent No.: US 9,424,154 B2
(45) Date of Patent: Aug. 23, 2016

(54) METHOD OF AND SYSTEM FOR COMPUTER SYSTEM STATE CHECKS

(75) Inventors: Rishi Bhargava, San Jose, CA (US); David P. Reese, Jr., Belmont, CA (US)

(73) Assignee: McAfee, Inc., Santa Clara, CA (US)

( * ) Notice: Subject to any disclaimer, the term of this patent is extended or adjusted under 35 U.S.C. 154(b) by 748 days.

(21) Appl. No.: 12/291,232

(22) Filed: Nov. 7, 2008

(65) Prior Publication Data

US 2013/0247032 A1    Sep. 19, 2013

Related U.S. Application Data

(63) Continuation-in-part of application No. 12/008,274, filed on Jan. 9, 2008.

(60) Provisional application No. 60/879,826, filed on Jan. 10, 2007, provisional application No. 61/002,540, filed on Nov. 8, 2007.

(51) Int. Cl.
*G06F 7/04* (2006.01)
*G06F 11/30* (2006.01)
*G06F 9/455* (2006.01)

(52) U.S. Cl.
CPC ....... *G06F 11/3006* (2013.01); *G06F 9/45558* (2013.01); *G06F 11/3051* (2013.01); *G06F 2009/45591* (2013.01)

(58) Field of Classification Search
CPC . G06F 9/45533; G06F 21/57; G06F 9/45558
USPC ............................................. 718/1; 726/17
See application file for complete search history.

(56) References Cited

U.S. PATENT DOCUMENTS

| | | | |
|---|---|---|---|
| 4,688,169 A | 8/1987 | Joshi | 364/200 |
| 4,982,430 A | 1/1991 | Frezza et al. | 380/50 |
| 5,155,847 A | 10/1992 | Kirouac et al. | |

(Continued)

FOREIGN PATENT DOCUMENTS

| | | |
|---|---|---|
| CN | 1383295 A | 12/2002 |
| CN | 101147379 | 3/2008 |

(Continued)

OTHER PUBLICATIONS

Kurt Gutzmann, "Access Control and Session Management in the HTTP Environment,"Jan./Feb. 2001, pp. 26-35, IEEE Internet Computing.

(Continued)

*Primary Examiner* — Krista Zele
*Assistant Examiner* — James Forman
(74) *Attorney, Agent, or Firm* — Patent Capital Group

(57) ABSTRACT

A system for and method of system state analysis of a computational system. The method is comprised of capturing selective state information of a computational system configured to operated with one or more guest machines running on a virtual machine layer and configured to output state information. The state information is then analyzed to for compliance checking. The system for system state analysis is comprised of a storage system, computation hardware configured to run the guest machines and the virtual machine layer, guest machines, a virtual machine layer configured to output guest machine state information, a system state snapshot server configured to control the virtual machine layer for the capture of state information.

25 Claims, 5 Drawing Sheets

(56) References Cited

U.S. PATENT DOCUMENTS

| | | | |
|---|---|---|---|
| 5,222,134 A | 6/1993 | Waite et al. | 380/4 |
| 5,390,314 A | 2/1995 | Swanson | 395/500 |
| 5,521,849 A | 5/1996 | Adelson et al. | 364/570 |
| 5,560,008 A | 9/1996 | Johnson et al. | 395/650 |
| 5,699,513 A | 12/1997 | Feigen et al. | 395/187.01 |
| 5,778,226 A | 7/1998 | Adams et al. | |
| 5,778,349 A | 7/1998 | Okonogi | 707/1 |
| 5,787,427 A | 7/1998 | Benantar et al. | |
| 5,842,017 A | 11/1998 | Hookway et al. | 395/707 |
| 5,873,086 A | 2/1999 | Fujii et al. | |
| 5,884,298 A | 3/1999 | Smith, II et al. | |
| 5,907,709 A | 5/1999 | Cantey et al. | 395/705 |
| 5,907,860 A | 5/1999 | Garibay et al. | |
| 5,926,832 A | 7/1999 | Wing et al. | |
| 5,944,839 A | 8/1999 | Isenberg | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,182,142 B1 | 1/2001 | Win et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | 713/200 |
| 6,321,267 B1 | 11/2001 | Donaldson | |
| 6,338,149 B1 | 1/2002 | Ciccone, Jr. et al. | 714/38 |
| 6,356,957 B2 | 3/2002 | Sanchez, II et al. | 709/328 |
| 6,393,465 B2 | 5/2002 | Leeds | 709/207 |
| 6,442,686 B1 | 8/2002 | McArdle et al. | 713/151 |
| 6,449,040 B1 | 9/2002 | Fujita | |
| 6,453,468 B1 | 9/2002 | D'Souza | |
| 6,460,050 B1 | 10/2002 | Pace et al. | |
| 6,496,477 B1 | 12/2002 | Perkins et al. | |
| 6,587,877 B1 | 7/2003 | Douglis et al. | 709/224 |
| 6,611,925 B1 | 8/2003 | Spear | |
| 6,658,645 B1 | 12/2003 | Akuta et al. | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | 717/126 |
| 6,795,966 B1* | 9/2004 | Lim et al. | 718/1 |
| 6,832,227 B2 | 12/2004 | Seki et al. | 707/101 |
| 6,834,301 B1 | 12/2004 | Hanchett | 709/223 |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | 370/254 |
| 6,934,755 B1* | 8/2005 | Saulpaugh et al. | 709/226 |
| 6,941,470 B1 | 9/2005 | Jooste | |
| 6,988,101 B2 | 1/2006 | Ham et al. | 707/10 |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,054,930 B2 | 5/2006 | Cheriton | |
| 7,065,767 B2 | 6/2006 | Kambhammettu et al. | 719/310 |
| 7,069,330 B1 | 6/2006 | McArdle et al. | |
| 7,082,456 B2 | 7/2006 | Mani-Meitav et al. | 709/203 |
| 7,093,239 B1 | 8/2006 | van der Made | |
| 7,096,500 B2 | 8/2006 | Roberts et al. | |
| 7,124,409 B2 | 10/2006 | Davis et al. | |
| 7,139,916 B2 | 11/2006 | Billingsley et al. | 713/182 |
| 7,152,148 B2 | 12/2006 | Williams et al. | |
| 7,159,036 B2 | 1/2007 | Hinchliffe et al. | |
| 7,177,267 B2 | 2/2007 | Oliver et al. | 370/216 |
| 7,203,864 B2 | 4/2007 | Goin et al. | |
| 7,251,655 B2 | 7/2007 | Kaler et al. | 707/9 |
| 7,290,266 B2 | 10/2007 | Gladstone et al. | |
| 7,302,558 B2 | 11/2007 | Campbell et al. | 713/1 |
| 7,330,849 B2 | 2/2008 | Gerasoulis et al. | |
| 7,340,684 B2 | 3/2008 | Ramamoorthy et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,360,097 B2 | 4/2008 | Rothstein | |
| 7,363,022 B2 | 4/2008 | Whelan et al. | 455/411 |
| 7,370,360 B2 | 5/2008 | van der Made | |
| 7,385,938 B1 | 6/2008 | Beckett et al. | |
| 7,406,517 B2 | 7/2008 | Hunt et al. | |
| 7,441,265 B2 | 10/2008 | Staamann et al. | |
| 7,463,590 B2 | 12/2008 | Mualem et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,506,364 B2 | 3/2009 | Vayman | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 | 8/2009 | Chebolu et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,694,150 B1 | 4/2010 | Kirby | |
| 7,698,744 B2 | 4/2010 | Fanton et al. | |
| 7,703,090 B2 | 4/2010 | Napier et al. | |
| 7,739,497 B1 | 6/2010 | Fink et al. | |
| 7,757,269 B1 | 7/2010 | Roy-Chowdhury et al. | |
| 7,765,538 B2 | 7/2010 | Zweifel et al. | |
| 7,783,735 B1 | 8/2010 | Sebes et al. | |
| 7,809,704 B2 | 10/2010 | Surendran et al. | |
| 7,814,554 B1 | 10/2010 | Ragner | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,840,968 B1 | 11/2010 | Sharma et al. | |
| 7,849,507 B1 | 12/2010 | Bloch et al. | |
| 7,853,643 B1 | 12/2010 | Martinez et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,873,955 B1 | 1/2011 | Sebes et al. | |
| 7,895,573 B1 | 2/2011 | Bhargava et al. | |
| 7,908,653 B2 | 3/2011 | Brickell et al. | |
| 7,925,722 B1 | 4/2011 | Reed et al. | |
| 7,937,455 B2 | 5/2011 | Saha et al. | |
| 7,950,056 B1 | 5/2011 | Satish et al. | |
| 7,966,659 B1 | 6/2011 | Wilkinson et al. | |
| 7,996,836 B1 | 8/2011 | McCorkendale et al. | |
| 8,015,388 B1 | 9/2011 | Rihan et al. | |
| 8,015,563 B2 | 9/2011 | Araujo et al. | |
| 8,028,340 B2 | 9/2011 | Sebes et al. | |
| 8,055,904 B1 | 11/2011 | Cato et al. | |
| 8,195,931 B1 | 6/2012 | Sharma et al. | |
| 8,205,188 B2 | 6/2012 | Ramamoorthy et al. | |
| 8,209,680 B1 | 6/2012 | Le et al. | |
| 8,234,709 B2 | 7/2012 | Viljoen et al. | |
| 8,234,713 B2 | 7/2012 | Roy-Chowdhury et al. | |
| 8,307,437 B2 | 11/2012 | Sebes et al. | |
| 8,321,932 B2 | 11/2012 | Bhargava et al. | |
| 8,332,929 B1 | 12/2012 | Bhargava et al. | |
| 8,352,930 B1 | 1/2013 | Sebes et al. | |
| 8,381,284 B2 | 2/2013 | Dang et al. | |
| 8,387,046 B1 | 2/2013 | Montague et al. | |
| 8,515,075 B1 | 8/2013 | Saraf et al. | |
| 8,539,063 B1 | 9/2013 | Sharma et al. | |
| 8,544,003 B1 | 9/2013 | Sawhney et al. | |
| 8,549,003 B1 | 10/2013 | Bhargava et al. | |
| 8,549,546 B2 | 10/2013 | Sharma et al. | |
| 8,555,404 B1 | 10/2013 | Sebes et al. | |
| 8,561,051 B2 | 10/2013 | Sebes et al. | |
| 8,561,082 B2 | 10/2013 | Sharma et al. | |
| 8,584,199 B1 | 11/2013 | Chen et al. | |
| 8,701,182 B2 | 4/2014 | Bhargava et al. | |
| 8,707,422 B2 | 4/2014 | Bhargava et al. | |
| 8,707,446 B2 | 4/2014 | Roy-Chowdhury et al. | |
| 8,713,668 B2 | 4/2014 | Cooper et al. | |
| 8,726,391 B1 | 5/2014 | Zhong et al. | |
| 8,739,272 B1 | 5/2014 | Cooper et al. | |

(56) References Cited

U.S. PATENT DOCUMENTS

| | | |
|---|---|---|
| 8,762,928 B2 | 6/2014 | Sharma et al. |
| 8,763,118 B2 | 6/2014 | Sebes et al. |
| 8,793,489 B2 | 7/2014 | Polunin et al. |
| 8,800,024 B2 | 8/2014 | Cooper et al. |
| 8,843,903 B1 | 9/2014 | Blaser et al. |
| 8,869,265 B2 | 10/2014 | Dang et al. |
| 8,875,292 B1 | 10/2014 | Bogorad et al. |
| 8,904,520 B1 | 12/2014 | Nachenberg et al. |
| 8,925,101 B2 | 12/2014 | Bhargava et al. |
| 8,938,800 B2 | 1/2015 | Bhargava et al. |
| 8,973,146 B2 | 3/2015 | Ramanan et al. |
| 9,112,830 B2 | 8/2015 | Cooper et al. |
| 9,134,998 B2 | 9/2015 | Roy-Chowdhury et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. ... 705/500 |
| 2002/0114319 A1 | 8/2002 | Liu et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0061506 A1 | 3/2003 | Cooper et al. |
| 2003/0065945 A1 | 4/2003 | Lingafelt et al. |
| 2003/0073894 A1 | 4/2003 | Chiang et al. ................ 600/407 |
| 2003/0074552 A1 | 4/2003 | Olkin et al. .................. 713/150 |
| 2003/0088680 A1 | 5/2003 | Nachenberg et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. ............... 709/245 |
| 2003/0120935 A1 | 6/2003 | Teal et al. ..................... 713/188 |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson .......................... 709/206 |
| 2004/0051736 A1 | 3/2004 | Daniell ......................... 345/752 |
| 2004/0054928 A1 | 3/2004 | Hall |
| 2004/0057454 A1 | 3/2004 | Hennegan et al. |
| 2004/0088398 A1 | 5/2004 | Barlow |
| 2004/0139206 A1 | 7/2004 | Claudatos et al. |
| 2004/0143749 A1 | 7/2004 | Tajalli et al. |
| 2004/0153650 A1 | 8/2004 | Hillmer |
| 2004/0167906 A1 | 8/2004 | Smith et al. |
| 2004/0172551 A1 | 9/2004 | Fielding et al. |
| 2004/0230963 A1 | 11/2004 | Rothman et al. ............. 717/168 |
| 2004/0243678 A1 | 12/2004 | Smith et al. |
| 2004/0255161 A1 | 12/2004 | Cavanaugh ................... 713/201 |
| 2004/0268149 A1 | 12/2004 | Aaron |
| 2005/0005006 A1 | 1/2005 | Chauffour et al. |
| 2005/0018651 A1 | 1/2005 | Yan et al. ..................... 370/352 |
| 2005/0022014 A1 | 1/2005 | Shipman |
| 2005/0071633 A1 | 3/2005 | Rothstein |
| 2005/0081053 A1 | 4/2005 | Aston et al. |
| 2005/0086047 A1 | 4/2005 | Uchimoto et al. |
| 2005/0091321 A1 | 4/2005 | Daniell et al. |
| 2005/0091487 A1 | 4/2005 | Cross et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. ................... 713/167 |
| 2005/0235360 A1 | 10/2005 | Pearson |
| 2005/0256907 A1 | 11/2005 | Novik et al. |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075299 A1* | 4/2006 | Chandramouleeswaran et al. ............................ 714/38 |
| 2006/0075478 A1 | 4/2006 | Hyndman et al. |
| 2006/0080656 A1 | 4/2006 | Cain et al. |
| 2006/0085785 A1* | 4/2006 | Garrett ............................ 718/1 |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0232265 A1 | 10/2007 | Park et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0297333 A1 | 12/2007 | Zuk et al. |
| 2007/0297396 A1 | 12/2007 | Eldar et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0059123 A1* | 3/2008 | Estberg et al. ............... 702/188 |
| 2008/0082662 A1 | 4/2008 | Dandliker et al. |
| 2008/0082977 A1* | 4/2008 | Araujo et al. .................... 718/1 |
| 2008/0086513 A1 | 4/2008 | O'Brien |
| 2008/0115012 A1* | 5/2008 | Jann et al. ...................... 714/38 |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1* | 7/2008 | Bowman et al. ................. 718/1 |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0295173 A1 | 11/2008 | Tsvetanov |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0178110 A1 | 7/2009 | Higuchi |
| 2009/0220080 A1 | 9/2009 | Herne et al. |
| 2009/0249053 A1 | 10/2009 | Zimmer et al. |

(56) References Cited

U.S. PATENT DOCUMENTS

| | | |
|---|---|---|
| 2009/0249438 A1 | 10/2009 | Litvin et al. |
| 2009/0320010 A1 | 12/2009 | Chow et al. |
| 2009/0320133 A1 | 12/2009 | Viljoen et al. |
| 2009/0328144 A1 | 12/2009 | Sherlock et al. |
| 2009/0328185 A1 | 12/2009 | van den Berg et al. |
| 2010/0049973 A1 | 2/2010 | Chen |
| 2010/0071035 A1 | 3/2010 | Budko et al. |
| 2010/0100970 A1 | 4/2010 | Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0299277 A1 | 11/2010 | Emelo et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0061092 A1 | 3/2011 | Bailloeul et al. |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0246753 A1 | 10/2011 | Thomas |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0110666 A1 | 5/2012 | Ogilvie |
| 2012/0159631 A1 | 6/2012 | Niemela et al. |
| 2012/0216271 A1 | 8/2012 | Cooper et al. |
| 2012/0233611 A1 | 9/2012 | Voccio |
| 2012/0278853 A1 | 11/2012 | Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1* | 4/2013 | Bhattacharjee et al. ......... 711/6 |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0179971 A1 | 7/2013 | Harrison |
| 2013/0227683 A1 | 8/2013 | Bettini et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247201 A1 | 9/2013 | Alperovitch et al. |
| 2013/0247226 A1 | 9/2013 | Sebes et al. |
| 2013/0268994 A1 | 10/2013 | Cooper et al. |
| 2014/0090061 A1 | 3/2014 | Avasarala et al. |
| 2014/0101783 A1 | 4/2014 | Bhargava et al. |
| 2014/0189859 A1 | 7/2014 | Ramanan et al. |
| 2014/0237584 A1 | 8/2014 | Cooper et al. |
| 2014/0250492 A1 | 9/2014 | Cooper et al. |
| 2014/0283065 A1 | 9/2014 | Teddy et al. |
| 2014/0283066 A1 | 9/2014 | Teddy et al. |
| 2014/0317592 A1 | 10/2014 | Roy-Chowdhury et al. |
| 2014/0351895 A1 | 11/2014 | Bhargava et al. |
| 2015/0121449 A1 | 4/2015 | Cp |
| 2015/0180884 A1 | 6/2015 | Bhargava et al. |
| 2015/0180997 A1 | 6/2015 | Ramanan et al. |
| 2015/0200968 A1 | 7/2015 | Bhargava et al. |
| 2015/0365380 A1 | 12/2015 | Cooper et al. |

FOREIGN PATENT DOCUMENTS

| | | |
|---|---|---|
| CN | 101218568 A | 7/2008 |
| CN | 101569129 | 10/2009 |
| CN | 101636998 A | 1/2010 |
| CN | 103283202 A | 9/2013 |
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| JP | 2005-275839 | 6/2005 |
| JP | 2005-202523 | 7/2005 |
| JP | 2005-275839 | 10/2005 |
| JP | 2006-59217 | 3/2006 |
| JP | 2006-302292 | 11/2006 |
| JP | 2007-500396 | 1/2007 |
| JP | 2008-506303 | 2/2008 |
| JP | 2008-217306 | 9/2008 |
| JP | 2009-510858 | 3/2009 |
| JP | 2010-16834 | 1/2010 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |
| WO | WO 2008/054997 A2 | 5/2008 |
| WO | WO 2011/003958 A1 | 1/2011 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |
| WO | WO 2014/105308 A1 | 7/2014 |
| WO | WO 2015/060857 A1 | 4/2015 |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

(56) References Cited

OTHER PUBLICATIONS

U.S. Appl. No. 12/008,274, entitled Method and Apparatus for Process Enforced Configuration Management, filed Jan. 9, 2008, Inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
Eli M. Dow, et al., "The Xen Hypervisor," Informit, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/551,673, entitled "Piracy Prevention Using Unique Module Translation," filed Sep. 1, 2009, Inventor(s): E. John Sebes et al.
U.S. Appl. No. 12/615,521, entitled "System and Method for Preventing Data Loss Using Virtual Machine Wrapped Applications," filed Nov. 10, 2009, Inventor(s): Sonali Agarwal, et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
Patent Examination Report No. 1, Australian Application No. 2011283160, mailed Oct. 30, 2013, 3 pages.
USPTO Dec. 6, 2013 Notice of Allowance received for U.S. Appl. No. 13/558,181, 10 pages.
USPTO Dec. 6, 2013 Notice of Allowance from U.S. Appl. No. 13/540,448, 7 pages.
USPTO Dec. 16, 2013 Notice of Allowance received for U.S. Appl. No. 13/558,227, 10 pages.
U.S. Appl. No. 14/127,395, entitled "Agent Assisted Malicious Application Blocking in a Network Environment," filed Dec. 18, 2013, Inventors: Chandan CP et al., 76 pages.
Patent Examination Report No. 1, Australian Application No. 2011283164, mailed Jan. 14, 2014, 6 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.
International Preliminary Report on Patentability in International Application No. PCT/US2012/057312, mailed Apr. 22, 2014, 5 pages.
International Preliminary Report on Patentability in International Application No. PCT/US2012/057153, mailed Apr. 22, 2014, 4 pages.
U.S. Appl. No. 14/263,164, entitled "System and Method for Redirected Firewall Discovery in a Network Environment," filed Apr. 28, 2014, Inventors: Geoffrey Cooper et al., 38 pages.
U.S. Appl. No. 14/277,954, entitled "System and Method for Interlocking a Host and a Gateway," filed May 15, 2014, Inventors: Geoffrey Cooper et al., 42 pages.
USPTO Feb. 21, 2014 Nonfinal Office Action from U.S. Appl. No. 13/229,502, 22 pages.
Citrix, CTX 115813—FAX: XenMotion, Live Migration—Citrix Knowledge Center, copyright 1999-2012 Citrix Systems, Inc., retrieved from http://support/citrix.com/article/CTX115813 on Aug. 7, 2012, 2 pages.
Citrix®, Citrix Synchronizer™ 1.0 RC Administrator Guide, Published May 11, 2010, copyright 2009 Citrix, 32 pages.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research report, Feb. 2, 2005, 13 pages.
U.S. Appl. No. 13/229,502, filed Sep. 9, 2011, entitled System and Method for Passive Threat Detection Using Virtual Memory Inspection, Inventor(s) Rishi Bhargava, et al.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,227, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.
VMware VMotion Product Datasheet, How is VMware VMotion Used in the Enterprise?, copyright 2009 VMware, Inc., retrieved from http://www.vmware.com/files/pdf/VMware-VMotion-DS-EN.pdf, printed Aug. 7, 2012, 2 pages.
VMware vSphere™ Experience Game-changing Virtual Machine Mobility, copyright 2012 VMware, Inc., retrieved from website: http://www.vmware.com/products/vmotion/overview.html, printed Aug. 7, 2012, 2 pages.
VMware vSphere™ Features of VMware vMotion for Live Migration of Virtual Machines, copyright 2012 VMware, Inc., retrieved from http://www.vmware.com/products/vmotion/features.html, printed Aug. 7, 2012, 2 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.Ist.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.

(56) References Cited

OTHER PUBLICATIONS

U.S. Appl. No. 13/728,705, filed Dec. 27, 2012, entitled "Herd Based Scan Avoidance System in a Network Environment," Inventors Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. PCT/US2012/055674, 9 pages.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
International Search Report and Written Opinion, International Application No. PCT/US2012/026169, mailed Jun. 18, 2012, 11 pages.
International Search Report and Written Opinion, International Application No. PCT/US2012/057312, mailed Jan. 31, 2013, 10 pages.
International Search Report and Written Opinion, International Application No. PCT/US2012/057153, mailed Dec. 26, 2012, 8 pages.
U.S. Appl. No. 13/437,900, filed Apr. 2, 2012, entitled "System and Method for Interlocking a Host and a Gateway," Inventors: Geoffrey Howard Cooper, et al.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, mailed Aug. 27, 2013, 8 pages.
USPTO Aug. 14, 2013 Notice of Allowance from U.S. Appl. No. 13/540,448.
U.S. Appl. No. 14/045,208, filed Oct. 3, 2013, entitled "Execution Environment File Inventory," Inventors: Rishi Bhargava, et al.
USPTO Office Action received for U.S. Appl. No. 13/540,448, mailed on Apr. 10, 2013, 20 pages.
USPTO Office Action received for U.S. Appl. No. 13/558,181, mailed on Aug. 7, 2013, 13 pages.
USPTO Office Action received for U.S. Appl. No. 13/558,181, mailed on May 8, 2013, 13 pages.
USPTO Office Action received for U.S. Appl. No. 13/558,227, mailed on Aug. 6, 2013, 13 pages.
USPTO Office Action received for U.S. Appl. No. 13/558,227, mailed on May 8, 2013, 22 pages.
USPTO Office Action received for U.S. Appl. No. 13/558,277, mailed on Oct. 3, 2013, 11 pages.
USPTO Office Action received for U.S Appl. No. 13/558,277, mailed on May 10, 2013, 22 pages.
PCT Application Serial No. PCT/US13/66690, filed Oct. 24, 2013, entitled "Agent Assisted Malicious Application Blocking in a Network Environment," 67 pages.
Patent Examination Report No. 1, Australian Application No. 2011283160, mailed Oct. 30, 2013.
PCT Application Serial No. PCT/US13/71327, filed Nov. 21, 2013, entitled "Herd Based Scan Avoidance System in a Network Environment," 46 pages.
Barrantes et al., "Randomized Instruction Set Emulation to Disrupt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
Notification of Transmittal of the International Search Report and the Written Opinion of the.International Searching Authority (1 page), International Search Report (4 pages), and Written Opinion (3 pages), mailed Mar. 2, 2011, International Application No. PCT/US2010/055520.
Tal Garfinkel, et al., "Terra: A Virtual Machine-Based Platform for Trusted Computing," XP-002340992, SOSP'03, Oct. 19-22, 2003, 14 pages.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.
U.S. Appl. No. 12/880,125, entitled "System and Method for Clustering Host Inventories," filed Sep. 12, 2010, Inventors(s) Rishi Bhargava, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava, et al.
U.S. Appl. No. 13/037,988, entitled "System and Method for Botnet Detection by Comprehensive Email Behavioral Analysis," filed Mar. 1, 2011, Inventor(s) Sven Krasser, et al.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

(56) References Cited

OTHER PUBLICATIONS

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
IA-32 Intel® Architecture Software Developer's Manual, vol. 3B; Jun. 2006; pp. 13, 15, 22 and 145-146.
USPTO Jun. 5, 2013 Notice of Allowance from U.S. Appl. No. 11/437,317, 8 pages.
USPTO Jun. 10, 2013 Notice of Allowance from U.S. Appl. No. 12/976,159, 9 pages.
International Search Report and Written Opinion, International Application No. PCT/US2013/071327, mailed Mar. 7, 2014, 12 pages.
"Optical stateful security filtering approach based on code words," Sliti, M.; Boudriga, N., 2013 IEEE Symposium on Computers and Communications (ISCC), 10 pages.
Rothenberg, et al., "A Review of Policy-Based Resource and Admission Control Functions in Evolving Access and Next Generation Networks," Journal of Network and Systems Management, 16.1 (2008) 14-45, 32 pages.
USPTO Sep. 10, 2014 Final Office Action from U.S. Appl. No. 13/229,502, 18 pages.
USPTO Oct. 2, 2014 Nonfinal Rejection from U.S. Appl. No. 14/257,770, 8 pages.
Muttik, Igor, and Chris Barton, "Cloud security technologies," Information security technical report 14.1 (2009), 1-6, 6 pages.
USPTO Feb. 12, 2015 Final Rejection from U.S. Appl. No. 14/257,770, 6 pages.
Baba, Tatsuya, et al., "A Proposal of an Integrated Worm Countermeasure System Based on Dynamic VLAN Control," Journal of Information Processing Society of Japan, Japan, Information Processing Society of Japan, Aug. 15, 2006, vol. 47, No. 8, pp. 2449-2511, 14 pages, English language Abstract only.
Fujita, Keisuke, et al., "Proposal of DF system with boot control function against unauthorized programs," Transactions of Computer Security Symposium 2007, Japan, Information Processing Society of Japan, Oct. 31, 2007, vol. 2007, No. 10, pp. 501-506, 7 pages, English language Abstract only.
Ashiwa, Takashi, "IT Keyword too late to ask: Bot," Nikkei Computer, Japan, Nikkei Business Publications, Oct. 30, 2006, No. 664, pp. 244-249, 14 pages, 7 pages of English translation.
USPTO Apr. 28, 2015 Notice of Allowance from U.S. Appl. No. 14/257,770, 8 pages.
Cheneau, Tony, et al., "Significantly improved performances of the cryptographically generated addresses thanks to ECC and GPGPU," Computers & Security, vol. 29, No. 4, Jun. 2010, pp. 419-431, 13 pages.
USPTO Jul. 10, 2015 Nonfinal Rejection from U.S. Appl. No. 14/045,208, 41 pages.
USPTO Jul. 20, 2015 Nonfinal Rejection from U.S. Appl. No. 14/251,009, 40 pages.
USPTO Aug. 21, 2015 Notice of Allowance from U.S. Appl. No. 13/229,502, 22 pages.
U.S. Appl. No. 14/848,522, entitled "Enforcing Alignment of Approved Changes and Deployed Changes in the Software Change Life-Cycle," filed Sep. 9, 2015, Inventors: Rahul Roy-Chowdhury et al., 41 pages.
USPTO Nov. 10, 2015 Final Rejection from U.S. Appl. No. 14/251,009, 13 pages.
USPTO Nov. 13, 2015 Final Rejection from U.S. Appl. No. 14/045,208, 36 pages.
USPTO Mar. 15, 2016 Nonfinal Rejection from U.S. Appl. No. 14/251,009, 30 pages.
USPTO May 24, 2016 Notice of Allowance from U.S. Appl. No. 14/045,208, 14 pages.
USPTO Jun. 2, 2016 Nonfinal Rejection from U.S. Appl. No. 14/848,522, 10 pages.
USPTO Jun. 24, 2016 Final Rejection from U.S. Appl. No. 14/251,009, 16 pages.

\* cited by examiner

METHOD OF AND SYSTEM FOR COMPUTER SYSTEM STATE CHECKS

RELATED APPLICATIONS

This application is a continuation-in-part of co-pending U.S. patent application Ser. No. 12/008,274, filed: Jan. 9, 2008, entitled "METHOD AND APPARATUS FOR PROCESS ENFORCED CONFIGURATION MANAGEMENT" which is hereby incorporated by reference in its entirety, and which claims priority under 35 U.S.C. §119(e) of the co-pending, co-owned United States Provisional Patent Application, Ser. No. 60/879,826, filed Jan. 10, 2007, and entitled "SOFTWARE THAT MESSAGES CHANGE CONTROL." This application further claims priority to United States Provisional Patent Application, Ser. No. 61/002,540 filed Nov. 8, 2007, and entitled "COMPLIANCE SOLUTION FOR V13 ENVIRONMENTS" and is also hereby incorporated by reference in its entirety.

FIELD OF THE INVENTION

The invention relates to methods of and systems for minimally invasive state checks of electronic computational systems including but not limited to computer systems and network systems for the purposes not limited to compliance, configuration, or security checks.

BACKGROUND OF THE INVENTION

The state of a system can include but is not limited to, the existence of files on a storage system, file permissions, file content, file permissions, registry key existence, registry key permissions, registry values, system software versions, kernel software versions, system variables, network configuration, hardware configuration, data structures within the operating system kernel, hardware state, processor states, database configuration, database content, and user permission levels. For security purposes, system auditing, or system compliance checking, there is a need to quickly and with minimal impact capture and analyze the state of a system.

The present state of the art uses individual software agents installed on each processing system to capture and analyze the system state. However, as discussed below there are several disadvantages to this configuration.

The system shown in FIG. 1A shows one embodiment of a prior art system 100 utilizing a software agent 120A-120C to provide a state check of the processing system. The embodiment of the computational system 100 shown includes system software 110, kernel software 130, the computational hardware 140 on which the system software 110 and kernel software 130 runs, and a storage system 150. The system software 110 includes application software for performing task specific operations. The kernel software 130 typically includes an operating system such an Unix, Linx; Microsoft NT, XP, Windows Vista®, and Windows Server® operating systems. The hardware 150 can be based on any commonly found CPU, memory, networking hardware, and other supporting hardware. The agents can be located within the system software, with the kernel, or with the hardware. Usually only one agent is found at either the system, kernel, or hardware level within a system.

In one configuration, an agent 120A located with the system software, is used to capture and analyze the state of the system 100. The agent 120A runs as a separate process(es) or application concurrently with the other system software 110. Disadvantages of a system software based agent 120A is that the agent 120A consumes large amounts of system resources such as CPU processing cycles, storage system bandwidth, and storage system space for taking state snapshots. Further, if the agent runs in parallel with the system software, the system configuration could change while capturing the system state and thus the agent can only report the system state at points within a potentially large time window. A further disadvantage of a system software based agent is that such an agent is limited in the scope of system state information that can be analyzed. A system software based agent 120A does not have access to the operating system kernel data structures and thus has limited ability to analyze the state of the kernel, or evaluate the kernel for viruses or root kits.

In a second configuration, a kernel based agent 120B is used to capture and analyze the state of the system 100. This configuration enables the agent to check a broader scope of state information including checks on the kernel data structures. However, this configuration has the same drawbacks as the first configuration. Specifically, the kernel based agent 120B consumes a significant amount of CPU cycles, storage system bandwidth, and storage space.

In a third configuration, a hardware based agent 120C is used to capture and analyze the state information of the system. A hardware board agent 120C is connected to the hardware 140. When a state check is to be performed, the hardware board agent 120C stops the processor and examines files, registries, system software states, and examines kernel data structures. Typically, the computational hardware 140 is stopped during the state snapshot capture and analysis. This implementation has the disadvantage of stopping the CPU and thus the computing system 100 unavailable during the state check. Further, the extra hardware required has the additional disadvantage that the hardware based agent board 120C can reduce the reliability of the system, and increase the power usage. Further, the cost varies with the number of server cards given that an agent board 120C is required for each server card. Further, a hardware board agent can introduce security issues of physically having to gain access to the hardware.

FIG. 1B illustrates a typical prior art data center 100B where many of processing units 110A-110n can be grouped. Each of the processing unit 110A-110n can be a stand alone server or a server blade, each having its own kernel (operating system). Each processor unit 110A-110n has an agent 120A-120n running on the processor. Such a configuration of servers has two drawbacks. First, each of the agents consumes a large amount of computational processing power for each processor. Secondly, the installation, maintenance, and update of hundreds of agents 120A-120n can be costly and time consuming.

FIG. 1C illustrates another prior art configuration 100C of processing units running guest machines 160A-160n. A guest machine 160 typically includes application software and a kernel that interfaces with the computational hardware and system resources through the virtual machine layer 170. The virtual machine layer 170 makes it appear to each guest machine that it is exclusively running on the hardware 180. Again each guest machine 160A-160n has agent software 120A-120n, each of which demands from the hardware 180 computation processing power to execute, and the time and expense to install, maintain, and upgrade. The drain on system resources, processing power and time for maintenance increases linearly with each additional guest machine. This configuration does not provide economies of scale with an increasing number of guest machines.

What is needed is a means to analyze the state of an electronic system with minimal impact to a performance of the system, a state analysis solution that is easy to maintain, and does not reduce the reliability of a system.

SUMMARY OF THE INVENTION

The invention provides a new, less intrusive, and easier to maintain system for capturing and analyzing the state of a computational processing system. The computational system is typically a computational system such as a server farm or data center and can have a number of guest computational machines running on a virtual machine layer. A state snapshot server can execute on a guest machine or can execute on separate hardware coupled to communicate with the virtual machine layer directly or through a network. Further the state snapshot server can work in conjunction with a configuration management server for compliance and security checking.

Within this document references are made to state information, state data, or a state snapshots which are considered to be equivalent. State snapshot information is comprised of persistent and non-persistent state information. Generally, non-persistent state information is associated with runtime information. State snapshot information includes file related information and physical memory information. The file related information includes but is not limited to file/directory existence, content, version, permissions and other attributes, registry key existence and permissions, registry value and existence, versions of the operating system, operating system components, attributes of system passwords such as the password length, and the age of the password, database configuration, schema structure and table values. Physical memory snapshot includes associated user memory and associated kernel memory. Snapshot state information found in kernel memory includes application runtimes, kernel runtime data structures, open network ports, network sockets connected with particular hosts, users logged into the system, virtual hardware configuration state information, and processor state information or a combination thereof. User memory state information includes state information on what programs a user is running and the state of user data structures that can indicated the presence of mal-ware. System security checks can involve the analysis of a combination of the above state information. If the type of system state analysis is a compliance check, then typically kernel checks, device state and processor state information is not included.

Further, the analysis the of the state information can be performed in terms of a policy. The policy is an information structure containing parameters, characteristics, ranges, and specific data relating to system state information that is captured and analyzed. Preferably the policy information is configurable and stored on the State Snapshot Server or any storage device accessible by the State Snapshot Server. For example, the policy can be a file stored on a disk directly attached to the State Snapshot Server or a disk on a network through which the State Snap Server can communicate. Also contemplated by the invention is the policy information being coded within the State Snapshot Server application. The policy specifies attributes by which to analyze of a piece of the state snapshot information. For example, the policy information can set ranges for state information such as but not limited to registry values ranges, database value ranges, environment or system variable ranges, and minimum password lengths. System characteristics can include whether a files is writable, and who has permission to change a file.

Further, the policy for runtime information can include which processes should be running, who can be logged in, what times a user can be logged in, what communication channels are active, which network ports are open, what host can be connected to the network sockets, and the analysis of kernel data structures to verify that the kernel data structures are not corrupted or infected by a root-kit virus. Specific data relating to system state can include but are not limited to the password names, names of allowed hosts, allowed or not allowed users, allowed communication protocols.

The specification refers to triggers for taking and analyzing snapshots of system state data. Triggers include changes in the configuration change information. Configuration change information is described in U.S. patent application Ser. No. 12/008,274, filed Jan. 9, 2008, entitled "METHOD AND APPARATUS FOR PROCESS ENFORCED CONFIGURATION MANAGEMENT" that is incorporated by reference in its entirety. Further, the triggers can include host content change requests. Host content change request are described in pending U.S. patent application Ser. No. 11/346,741, filed Feb. 2, 2006, entitled "ENFORCING ALIGNMENT OF APPROVED CHANGES AND DEPLOYED CHANGES IN THE SOFTWARE CHANGE LIFE-CYCLE" that is incorporated by reference in its entirety. Further, the triggers can be based on a specified user logging on or off a system, a process stop/start, or a reboot event on a Guest Machine, a State Snapshot Server, or a Configuration Management Server.

A first aspect of the invention is for a method of computational system state analysis. The method involves the steps of capturing selective state information of a computational system having one or more guest machines running on a virtual machine layer configured to output the state information. In a subsequent step, the state information is analyzed. The guest machines can have the same or different kernels (operating systems) running each of the guest machines.

In one embodiment, the state information is selectively specified on a guest machine basis. The capture of this state information can be for one guest machine, multiple guest machines or all guest machines.

In another embodiment, the analysis of the state information is according to a policy. The analysis can include processing according to the policy persistent state information, non-persistent information, or a combination thereof. Further, the processing of non-persistent state information includes, kernel state data, user state data and a combination thereof. The analysis of the kernel data structures can include verifying that root kit has not been configured into the system, the absence of a virus, or a given configuration of the kernel and the analysis of the physical user data snapshot can check fro mal-ware or whether the programs being run conform with the policy.

In another embodiment, the state information is stored on a storage system. The storage system can be directly coupled to the hardware running the virtual machine layer and guest machines or can be a distributed storage system. The coupling of the storage system can be directly tied to the computational hardware executing the virtual machine layer and guest machines or can be coupled using a network interface including ethernet, optical, or SAN (Storage Area Networks).

In a further embodiment, the method includes the step of controlling the virtual machine layer to selectively capture system state information. The capture of state information includes selective capture of information on a single guest machine or the capture of state information from a specified plurality of guest machines. The control of the virtual machine layer that generates snapshots can originate from a process or a software program running on a guest machine or by a process or software program running on a different computational hardware. The coupling of the control process with the virtual machine layer can be made directly or indirectly, such as through a network. Also, control over other communication links such as a direct communication link is contemplated. Alternatively, special purpose software or networking software can be configured to communicate with the virtual machine layer through the kernel running on the virtual machine.

In another embodiment, the method can include configuration management steps used in the maintenance and upgrading of an electronic computational system. The method can include the creating or opening configuration change ticket. The capture of the system state information and the analysis of the state information can be triggered in response to the creating or opening the configuration change ticket. Preferably, in the configuration change that is specified in the configuration change ticket is implemented before the capture and analysis of the state information for the one or more guest machines.

In another embodiment the capturing and processing of a state snapshot can be invoked by a number of triggers. These triggers can include a computer scheduled event, a change to the policy, or event triggers. The policy change can include a change to a file containing policy information or an application that is given an indication that the policy is changed. The triggers are described above and in the incorporated references.

In a further embodiment, the issuing of the change ticket includes using change process rules in the configuration management of a computational system. The analysis of the system state can utilize the change process rules in that analysis. The analysis can use the change process rules to extend the configuration, compliance, or security analysis to include when configuration change was made and by whom. Alternatively, the analysis can be used to determine any conflicts between the configuration, compliance, or security requirements and a configuration change. In one configuration, the analysis of the system state information is performed on the same computational hardware which executes the virtual machine layer and guest machines. In another embodiment, separate computational hardware is used for the state snapshot server. Further, in one embodiment, the configuration management system executes on one of the guest machines. In another embodiment, the configuration management system executes on hardware separate from the hardware executing the virtual machine layer and the guest machines.

Another aspect of the invention, is for a system for analyzing the state of a computational system. The system includes one or more guest machines, a storage system, and a virtual machine layer interfaced to the one or more guest machines. The virtual machine layer is configured to generate system state information for the one or more guest machines. A state snapshot server is configured to control the virtual machine layer. A first computation hardware unit is configured to execute the one or more guest machine and the virtual machine layer, and is coupled to the storage system. The storage system can be coupled through a network including but not limited to ethernet or a storage area network. Preferably, the virtual machine layer is configured to take fast system snapshots of state data without effecting the performance of any of the guest machines. The first computational hardware unit can comprise a single computational processing unit or a plurality of processing units. The processing units can be but is not limited to a single processor, multiple processing cores, a server blade, an array of processors or a combination thereof.

Further the analysis of the state information data can be analyzed according to a policy. A trigger can be used to invoke a state snapshot and analysis. The triggers are described above and in the incorporated references.

In one embodiment, the state snapshot server is configured to execute within one of the guest machines. In a different embodiment, the state snapshot server is configured to execute on a second computational hardware unit. The second computational hardware unit can be located away-from or near the first computational hardware unit. The communication channel between the first and second computational hardware unit can be through a wired or wireless network or through a dedicated communication channel using standard or proprietary communication protocols. Further, the taking and process of a state snapshot can be invoked by a number triggers. These triggers can include a computer scheduled event, a change to the policy, or event triggers. The policy change can include a change to a file containing policy information or an application that gives an indication that the policy is changed. The triggers are described above and in the incorporated references.

In another embodiment, the system further comprises a configuration management server. The server is configured to communicate control and configuration information with the state snapshot server. The configuration management server can issue a configuration change ticket. In response to the issuing the change ticket, the configuration management server can configure the state snapshot server to perform a system snapshot and analysis of the system state. The analysis can be performed according to a policy. In one embodiment the system state snapshot is taken before the configuration change indicated in the issued configuration ticket. In another embodiment, the state snapshot and analysis is performed after the configuration change is performed. The analysis of the system snapshot can include utilizing the change process rules information communicated by the change management server to the state snapshot server. Further, all or part of the state analysis results can be incorporated into the change ticket. The configuration management server can either read the information from an accessible file, request the information from the state snapshot server, or the state snapshot server can send the data to the configuration management server.

In another aspect of the present invention, the invention embodies one or more machine readable storage devices having processor readable code embodied on the storage devices for programming computational hardware to perform a method of system state analysis of a computational system. The code comprises the steps of capturing selective state information of a computational system having one or more guest machines running on a virtual machine layer configured to output the state information and analyzing the state information. The machine readable storage devices can include but is not limited to CD-ROMs, DVDs, hard disks, solid-state storage devices, tape, floppies, or other magnetic media. In one embodiment the state information is selectively captured from one or more guest machines. In another embodiment, the captured system state data is process according to a policy. In another embodiment the processor readable code is embodied on the storage devices is configured to read a system state snapshot from a storage system and then analyze the snapshot information.

BRIEF DESCRIPTION OF THE DRAWINGS

The invention is better understood by reading the following detailed description of exemplary embodiments in conjunction with the accompanying drawings.

DETAILED DESCRIPTION OF THE INVENTION

Figure 1A:
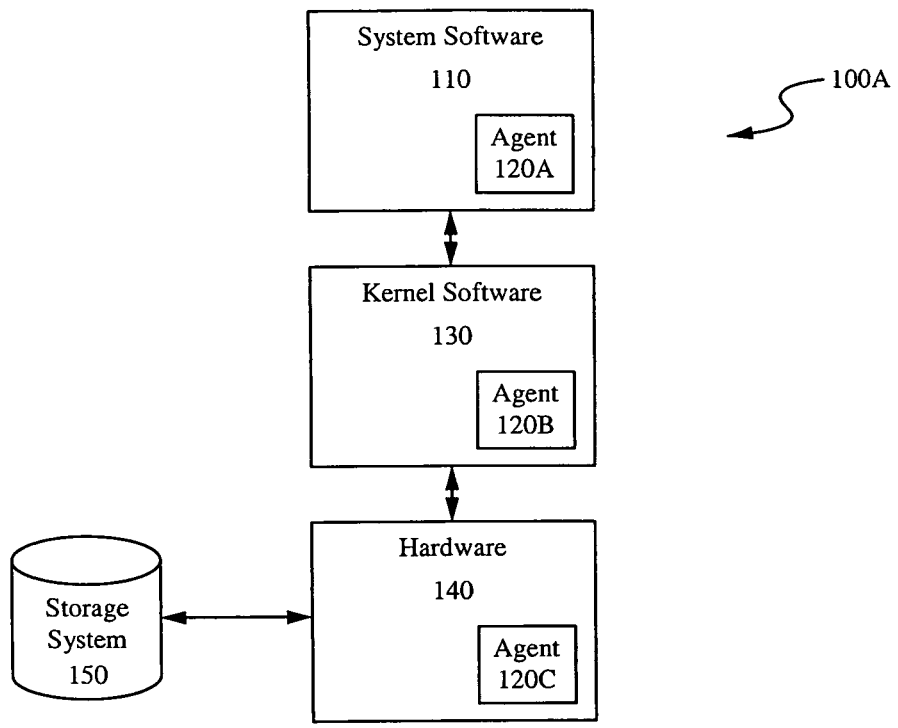
FIG. 1A illustrates different configurations of a prior art processing unit with an agent that performs a system state analysis. The agent is shown operating selectively at a system level, a kernel level, or at a hardware level.
Figure 1B:
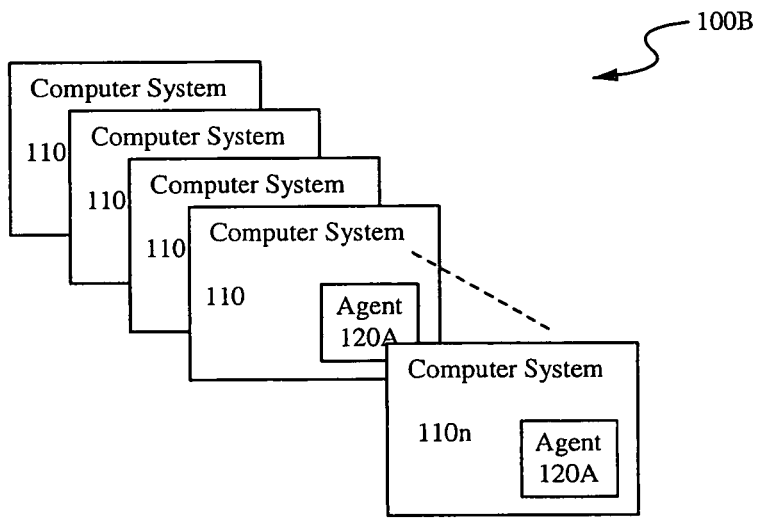
FIG. 1B illustrates a prior art server farm or processing center with multiple processing units, wherein each processing unit has a system analysis agent.
Figure 1C:
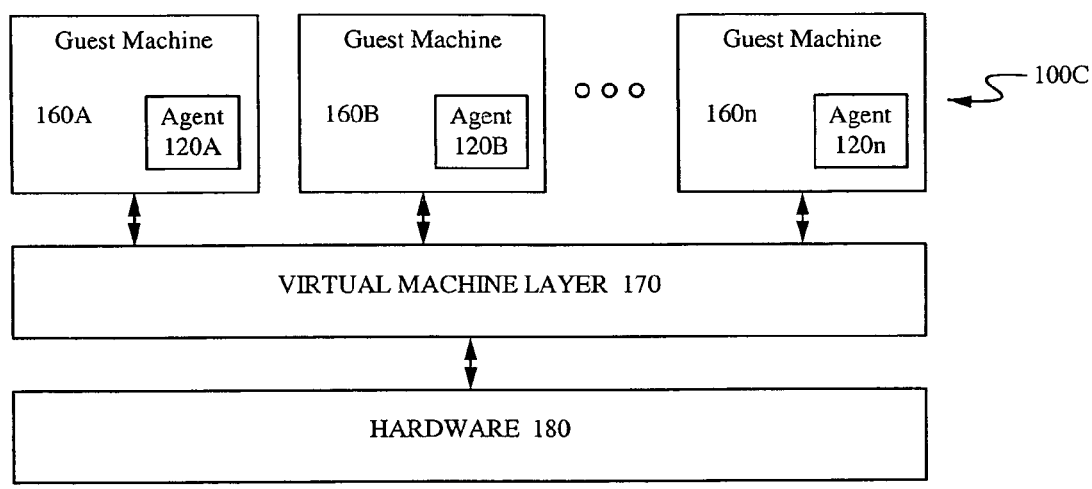
FIG. 1C illustrates a prior art processing system with multiple guest machines running on a virtual machine layer where each guest machine has an agent for performing system state analysis.

The following description of the invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present inventions are possible and can even be desirable in certain circumstances, and are a part of the present invention. Thus, the following description is provided as illustrative of the principles of the present invention and not in limitation thereof, since the scope of the present invention is defined by the claims.

The illustrative embodiment of the invention provides means for analyzing the system state of a processing system for purposes including but not limited to configuration management, compliance or security checking, security enforcement or a combination thereof. Processing systems that could benefit from the invention include but are not limited server farms, data centers, and processing clusters. Also contemplated by the invention is the use of the invention within networking equipment. Further, the methods of and system for system state snapshotting and analysis can be integrated with configuration management systems to provide control of configuration changes, post change compliance security checking or a combination thereof. After an authorized configuration management change is implemented, a compliance check can be performed to validate that a desired system configuration is made. Any standard configuration management system can be used. Also, a process enforced configuration management system can be utilized. Detail of such a system can be found in U.S. patent application Ser. No. 12/008,274, filed: Jan. 9, 2008, entitled "METHOD AND APPARATUS FOR PROCESS ENFORCED CONFIGURATION MANAGEMENT" which is hereby incorporated by reference in its entirety.

The invention comprises a state snapshot server which controls a virtual machine layer in the taking of system state snapshots and the analysis of the snapshot data.

The invention provides a number of benefits. First, using the virtual machine layer to take system state snapshots is typically much quicker than taking a snapshot from the a guest machine. Many of the current implementations of virtual machine layer utilize incremental file systems where the state of the files, including the content can quickly be stored away. Secondly, the analysis of the system state can be performed with minimal impact to the performance of each guest machine. Further, a system state snapshot taken by the virtual machine layer can include persistent and non-persistent state information where the non-persistent state information includes physical memory, both user and kernel, state information. As described above, the state snapshot information can be analyzed according to a policy. This includes the analysis of non-persistent system snapshot data that includes kernel and user physical memory. The analysis of the physical memory can include but is not limited to validating kernel data structures have not been corrupted by a root kit or a virus, that the kernel is properly configured, and that the kernel has the required components installed. Further the user data memory can be analyzed to determine whether the programs being run conform with the policy and whether any of the programs are corrupted by mal-ware. A major benefit of the current invention is that only one snapshot server has to be installed, maintained, and upgraded as oppose one for each guest machine.

Figure 2:
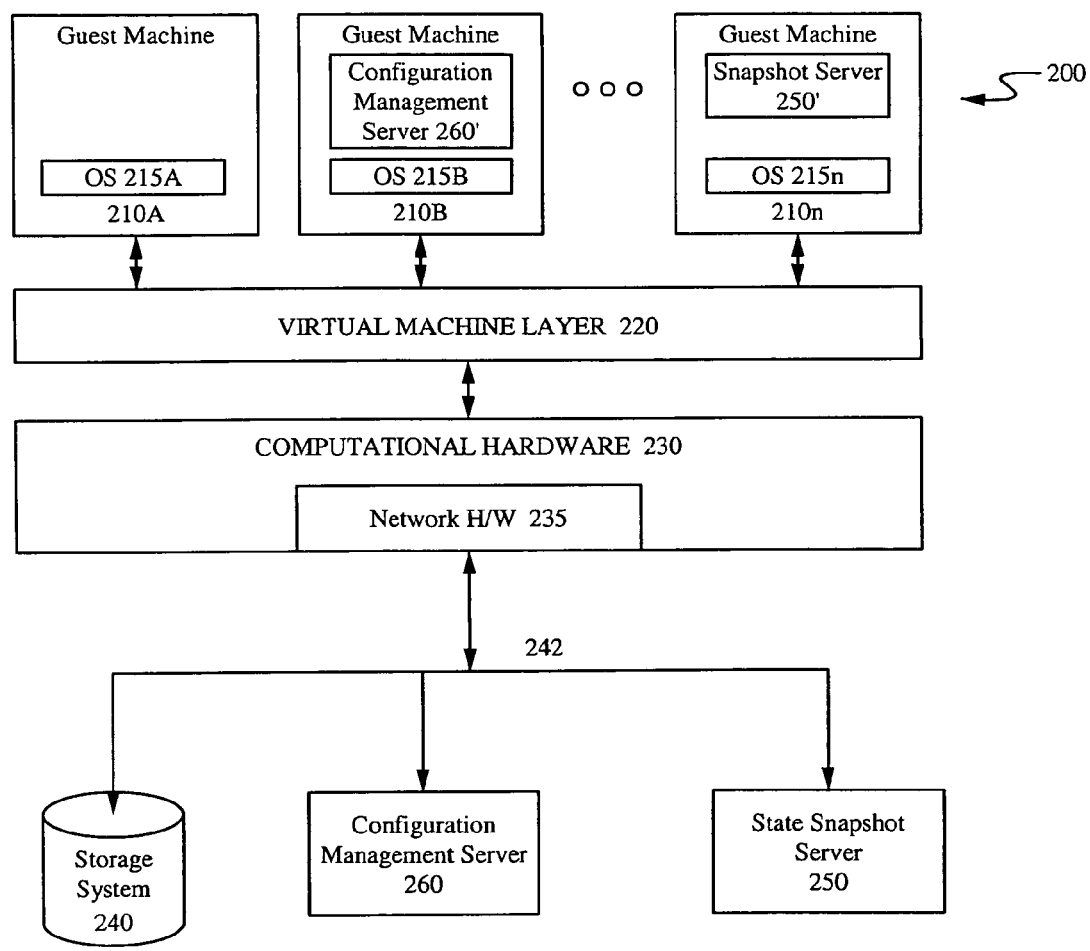
FIG. 2 illustrates one embodiment of the current invention having a plurality of guest machines running on a virtual machine layer, a state snapshot server, and a configuration management server.

An illustrative embodiment of the present invention is shown in FIG. 2. The system 200 is illustrates one embodiment of a system 200 that provides system state snapshot analysis and can further provide system configuration management. The system 200 includes computational hardware 230. A virtual machine layer 220 executes on the computational hardware 230. One or more guest machines 210a-210n can interoperate with the computational hardware 230, interfacing through the virtual machine layer 220. The computational hardware 230 are coupled to the storage systems 240, configuration management server 260/260', and a system state snapshot server 250/250'. The computational hardware 230 can include network hardware 235 to interface with a storage system 240 or the other network based processing components including but not limited to the configuration management server 260 and the state snapshot server 250. The computational hardware 230 can include a single core processor, a multi-core processor, a server a server blade having multiple multi-processors, or a racks of server blades within a data center providing distributed computational resources.

The virtual machine layer 220 is preferably a software component that runs on the computational hardware 230. The virtual machine layer 220 is to allows multiple kernels 215A-215n, also referred to as operating systems, to share the same computational hardware and its associated resources including the storage systems 240 and the network communications 235. The operating system 215A-215n on each guest machine can be the same operating system, different versions/configurations of the same operating system, a different operating system 215 or a combination thereof. Each operating system is able to run concurrently on the same computational hardware 230 while the virtual machine layer 220 makes it appear to each operating system 215 that it the only operating system 215 controlling the hardware 230. The advantage of a system configured with a virtual machine layer 220 is that different software applications can use either a different operating system 215, a different version of the operating system 215, or different configuration of an operating system 215. For example, an accounting software package may require Unix while the engineering tools require two different versions of version of Linx, while Microsoft Windows® Server is used for general file sharing services. Instead of requiring a separate dedicated computational hardware 230 for each of the of different operating systems 215 and applications, the computational hardware 230 can be easily shared. Two commonly used virualization machines are VMware®, Widows Virtual Server by Microsoft®, or Microsoft Virtual PC®. The virtual machine layer 220 has an interface for the storing a snapshot of the state of file system and a kernel state each guest machine 210A-210n. These snapshots can be taken by a state snapshot server 250/250', specifying for each guest machine the system state snapshot to be taken. Further, the virtual machine layer 220 can implement an incremental file system. The incremental file system operates by saving and tracking incremental changes to a file. Thus, a snapshot of the file does not require the storage of an entire file but only the storage of references to the incremental changes up to the time when a snapshot is taken. Saving this incremental information takes significantly less time than storing a copy of an entire file for state analysis.

The computational hardware 230 can range from a single processor to a distributed data center utilizing racks of server blades. Thus, the virtual machine layer 220 abstracts the computational hardware 230 allowing the computational resource to be more effectively shared between different applications requiring different operating system environments. The computational hardware 230 is coupled to the networking hardware 235 for interfacing with storage devices or to other processing systems including but not limited to configuration management servers 260 or state snapshot servers 250. The interface is not limited to a single network or a specific type of network. The connection 242 to the storage system 240 can be over ethernet or storage area networks.

The guest machines 210A-210n include system software including applications, and kernel software 215A-215n (the operating system). The kernel software 215 accesses hardware resources through the virtual machine layer 220 which makes it appear to each kernel software 215 of each guest machine 240 as if it is the only operating system controlling the hardware resources. Each guest machine 210 can access the network 242 or storage systems 240 attached to the computational hardware 230. The state snapshot server 250' and the configuration management server 260' can execute as an application or process on one of the guest machines 210.

The storage system 240 can be any commonly found media designed to interface with computational systems such as data server. The storage system 240 can include disk drives, solid state storage, tape drives or any other magnetic media. Preferably, the interface with the storage system 240 has a high bandwidth. A SAN or storage area network 242 can be used to couple the storage system 240 with the computational hardware 230. The guest machines 210 can access the storage system through the network 242. The storage system 240 can be partitioned such that each guest machine 210 only has access to a part of the storage system 240. The state snapshot server 250 may also be coupled to the storage system over a SAN or through another type of network 242. State snapshots or information referenced by the snapshot for an incremental file systems is stored on the storage system or can be directly used by the state snapshot server 250/250'.

The state snapshot server 250/250' controls the virtual machine layer 220 to produce system state snapshots of the guest machines 210A-n. Further references to the guest machines 210A-n can include any of the guest machines and can be referenced the numerical indicator 210. The state snapshot server 250/250' is shown as either a separate snapshot server 250 running on different computational hardware than the guest machines 210, or can be a state snapshot server 250' running on a guest machine 210. Further references to the state snapshot server 250, 250' will refer to either configuration unless stated otherwise and will only use the numerical indicator 250. The state snapshot server 250 can also interface with the configuration management server 260/260' or through user interface. Further references to the configuration management server 260/260' will refer to either configuration unless stated otherwise and will only be indicated by the numerical indicator 260. A user interface can provide control for taking system state data, storing and analyzing. Communication with the storage system can be over network including but not limited to ethernet, SANs or over a dedicated communication channel. Communication with the virtual machine layer 220 can be over interprocess communication protocols such as but not limited to sockets for the case were the snapshot sever is running on a guest machine 210, or though a library or kernel call.

The configuration management server 260 is used to provide a process enforced system for making system configuration changes. The U.S. patent application Ser. No. 12/008,274, filed: Jan. 9, 2008, entitled "METHOD AND APPARATUS FOR PROCESS ENFORCED CONFIGURATION MANAGEMENT" which is hereby incorporated by reference in its entirety describes in detail a process enforced configuration management system. The configuration management system uses change process rules to control when and if a configuration change is made. The configuration management system 260 can execute on a server with separate hardware and communicate with the state snapshot server 250 over a network. Alternatively, the configuration management server 260' executes on a guest machine. Communication with the state snapshot server can be through but not limited to common interprocess or network communications including but not limited to socket communication.

Figure 3:
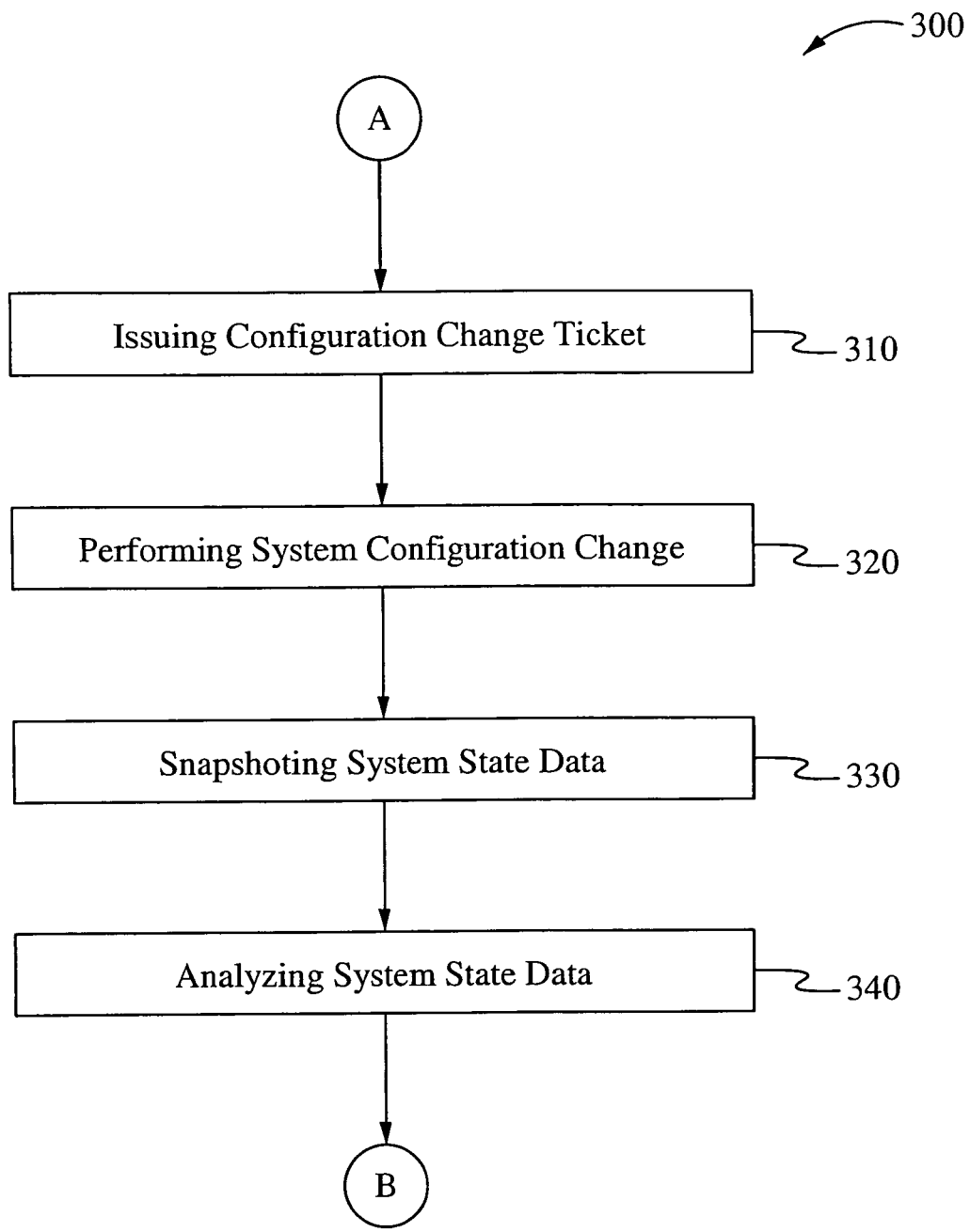
FIG. 3 is a block diagram illustrating a method of taking system state snapshots and performing state analysis on a system state snapshot.

FIG. 3 is an illustrative embodiment of the process 300 for system state analysis. The process involves the controlling a virtual machine layer to take a system state snapshot and analyze the state data. The process begins at A. In step 310, associated with one embodiment of the invention, a configuration management system generates a configuration change ticket. The configuration change ticket will indicate changes to be made to a computational system 200. In the step 320, associated with one embodiment of the invention, the configuration change specified in the configuration change ticket is made. Upon completion of the configuration change, or in response an operator input, the step 330 is performed. In step 330, the virtual machine layer is controlled to take a snapshot of the state information for one or more guest machines 210. While step 330, taking a snapshot of state information, is described as occurring after a step 320, the configuration change, the invention contemplates these two step being performed in the opposite sequence.

Figure 4:
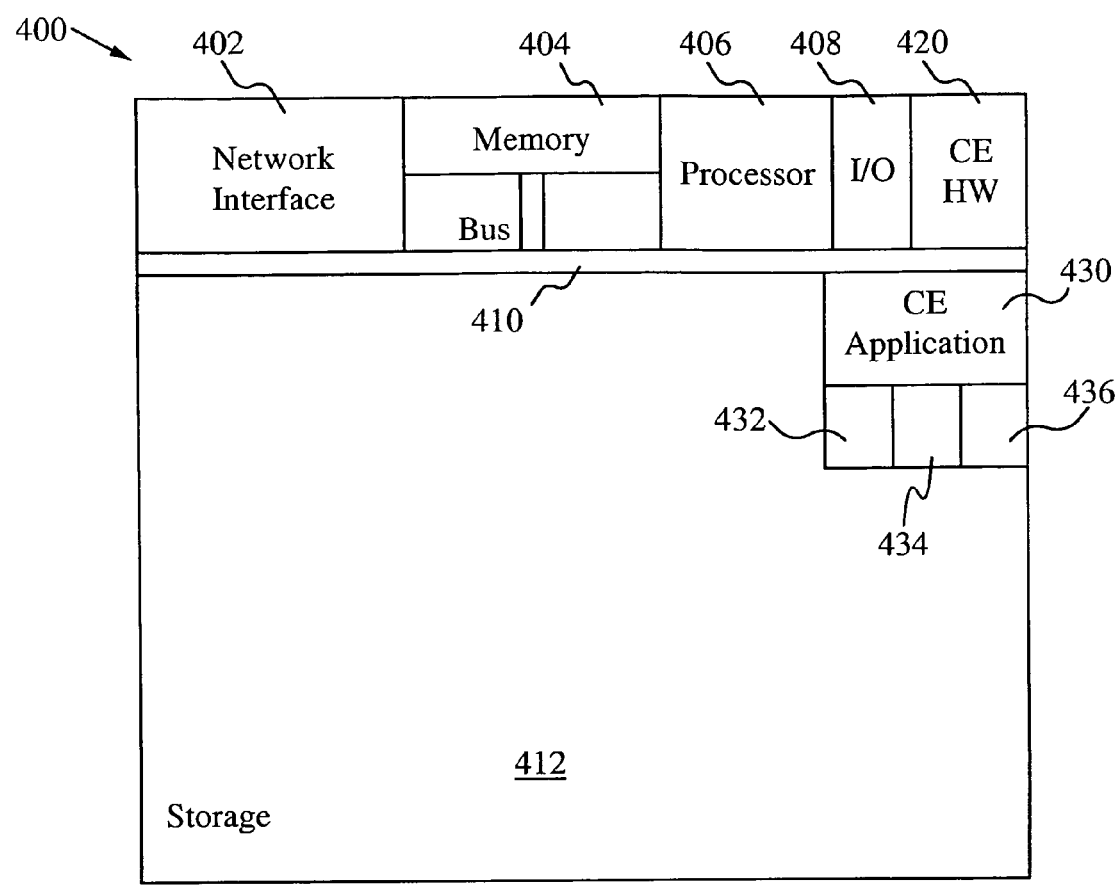
FIG. 4 illustrates a block diagram of an exemplary computing device configured to implement a state snapshot server.

FIG. 4 illustrates a block diagram of an exemplary computing device 400 configured as a System State Snapshot Sever implementing a method of taking a system state snapshot and analysis of a computational system. The snapshot server 400 can control a virtual machine layer 220 executing on computational hardware and either directly analyze the state information or access and analyze state snapshots stored on a storage system 412. The storage of the snapshots and the system state snapshot server code can be stored on separate devices or on the same device. For example, the state snapshot code could be stored on a tape local hard drive or CD-ROM and the state snapshots could be stored on a disk farm. Further, the computing device 400 is configured to communicate with other computational systems such as a configuration management server 260 or though a human interface such as a graphical user interface. The communication can be through a network, direct communication through a dedicated communication link, or through an operating system communication channel such as a socket. For example, if a computing device 400 is running on a guest machine, it can connect over a socket interface or other communication interface with a virtual machine layer. The computing device requests that a system state snapshot of one or more of the guest machines be generated. The snapshot information is then stored on a storage system 240 or is communicated directly to the state snapshot server 250 device for analysis. Additionally, the invention contemplates working with incremental file systems. Only the references to a sequence of incremental files need to be stored to form a snapshot of a file. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 can to be any conventional computer memory known in the art. The storage device 412 can include a hard drive, tape, CDROM, CDRW, DVD, DVDRW, flash memory card or any other storage device. The computing device 400 can include one or more network interfaces 402. An example of a network interface includes a network card coupled to an Ethernet or other type of LAN. The I/O device(s) 408 can include one or more of the following: keyboard, mouse, monitor, display, printer, modem, touchscreen, button interface and other devices including remote systems. The state snapshot server application(s) 430 control the virtual machine layer 220 and analyze state snapshots that can be stored in the storage device 412 and memory 404. The state snapshotserver applications 430 are processed as applications which are typically processed data. More or fewer components shown in FIG. 4 can be included in the computing device 400. Additional processors, either distributed or not distributed, and additional storage can be incorporated.

In some embodiments, the state snapshot server application(s) 430 includes several applications and/or modules. In some embodiments, the state snapshot server application(s) 430 include an analysis module 432, a control module 434 and an configuration management interface and control module 436.

To analyze system state snapshots, the state snapshot server 250 controls a virtual machine layer 220 to take a snapshot of one or more of the guest machines. The snapshot is then also analyzed according to a policy. The policy can include analysis parameter for persistent state information and non-persistent state information. The non-persistent state information can include user and kernel physical memory. In some embodiments, via an external interface, a configuration management server 260 sends control messages to the state snapshot server 250 to take and analyze the system state snapshot. These control messages can be the result of a trigger. The configuration management server 260 can send information related to change process rules that can be used in the analysis of the system state snapshots. For example, the configuration management server 260 can have rules on who and when a configuration change can be made. For security or compliance reasons, there can be restrictions related to these parameters. This allows for configuration, compliance, and security verification to extend beyond just state information. This invention now enables the incorporation of the additional information of "who" and "when" a configuration change was made. For example, the verification can now include a check of who made a configuration change, the time that it was made, and that the change was properly authorized as specified in a configuration change ticket and at the time specified by the configuration change ticket.

In operation, the state snapshot server 250 controls the taking and analyzing of state snapshots of guest machines 210 through the control of the virtual machine layer 220 in a manner that has minimal effect on the guest machine 210 performance. As discussed above, the state snapshot sever 250' can executed on one of the guest machines 210 or on a separate piece of computational hardware. The state snapshot server 250 receives a control input for the taking and analyzing of one or more snapshots from one or more of the guest machines 210. The source of the control can be a user input from a terminal, a graphics display device, or can be scheduled by the operating system to execute a system state snapshot at a specified time. Further, the system state snapshot server 250 can be configured to be controlled by another process, application or server such as a configuration management server 260. In response to the issuance of a configuration change ticket, the configuration management server 260 can change the configuration of one or more of the guest machines 210, associated files systems or the computational hardware 230 configuration. Subsequently an indication is communicated to the state snapshot server 250 to take and analyze one or more system state snapshots. Preferably, the state snapshot server 250 interfaces with a virtual machine layer 230 that implements incremental file storage. Thus, as described above, the system state can be saved with a minimal copying of files. Thus, the time to take and store a snapshot is minimized and computation processing time and storage bandwidth is minimized.

The state snapshot server 250 can communicate with the virtual machine layer 220 over any standard computer communication method. Communication with the virtual machine can be over network sockets, signals, or shared memory communication. A dedicated program or library can be added to the guest machine 210 for the state snapshot application or process to communicate with the virtual machine layer 220 for the configuration where the state snapshot server 250' is running on a guest machine. The state snapshot server 250 indicates to the virtual machine layer 220 which state snapshots are to be taken. The state snapshot server 250 can also specify the scope of the snapshot data to be taken. For example, snapshots of only file data can be taken. In another snapshot, the snapshots could include kernel data to be analyzed.

The virtual machine layer 230 can communicate back to the state snapshot server upon completion of the state snapshot. The snapshot is then analyzed by the state snapshot server 250. The analysis can include checking the state of the system against a specified state configuration. The analysis check includes analyzing the system snapshot data according to a policy. As described above, the system snapshot data can include persistent and non-persistent data including physical memory data that include user and kernel state information. Further, the analysis can utilize information provided by the configuration management server 260. This information can include process change rules from which conflicts between the configuration change, configuration change rules and a compliance configuration can be compared. The results of the analysis can be stored on a storage system 240, displayed on a graphical display device, communicated to the configuration management server 260, or a combination thereof.

What is claimed is:

1. A method of system state analysis of a computational system comprising:
specifying a scope of state information to be captured based on a selected analysis to be performed on captured state information, wherein the scope of the state information is to include at least kernel memory information if the selected analysis is a first type of analysis, wherein the scope of the state information is to exclude kernel memory information if the selected analysis is a second type of analysis, and wherein the scope of the state information is specified for one or more selected guest machines of a plurality of guest machines running on a virtual machine layer of a computational system;
controlling the virtual machine layer to capture selective state information of the one or more selected guest machines running on the virtual machine layer, wherein the selective state information is within the specified scope of the state information; and
analyzing the captured selective state information according to the selected analysis, wherein the selected analysis includes a policy containing an attribute, and wherein the attribute is used to analyze a portion of the captured selective state information, wherein the second type of analysis is a compliance check to validate that the computational system includes a desired system configuration, and wherein the first type of analysis is to:
validate kernel data structures in the kernel memory of a kernel have not been corrupted;
validate the kernel is properly configured; and
validate the kernel includes necessary components.

2. The method of claim 1, wherein the attribute of the policy comprises one of a parameter, a system characteristic, a range, or specific system-related data to be compared to at least a portion of the captured selective state information.

3. The method of claim 1, further comprising storing the captured selective state information within a storage system.

4. The method of claim 3, wherein the storage system is a distributed disk storage system.

5. The method of claim 1, wherein the controlling of the virtual machine layer is through a process executing on a single one of the guest machines.

6. The method of claim 1, wherein the controlling of the virtual machine layer is through a process executing on a second computational system.

7. The method of claim 1, further comprising issuing a configuration change ticket, wherein the controlling the virtual machine layer and the analyzing the captured selective state information are performed in response to the issuing of the change ticket.

8. The method of claim 7, wherein a configuration change specified in the configuration change ticket is implemented before the selective state information for the one or more guest machines is captured.

9. The method of claim 8, wherein the issuing of a change ticket includes change process rules and the analysis of the captured selective state information includes the change process rules.

10. The method of claim 1, wherein the controlling the virtual machine layer is triggered by at least one of a scheduled system state analysis, a change to a policy, and event triggers.

11. A system for analyzing the state of a system comprising:
one or more guest machines;
a storage system;
a virtual machine layer interfaced to the one or more guest machines, wherein the virtual machine layer is configured to generate state information for the one or more guest machines;
a system state snapshot server configured to:
specify a scope of state information to be captured based on a selected analysis to be performed on captured state information, wherein the scope of the state information is to include at least kernel memory information if the selected analysis is a first type of analysis, wherein the scope of the state information is to exclude kernel memory information if the selected analysis is a second type of analysis, and wherein the scope of the state information is specified for at least one selected guest machine of the one or more guest machines;
control the virtual machine layer to capture selective state information for the at least one selected guest machine;
analyze the captured selective state information; and
produce a state analysis result, wherein the captured selective state information is within the specified scope of state information, wherein the captured selective state information is analyzed according to the selected analysis, and wherein the selected analysis includes a policy containing an attribute that is used to analyze a portion of the captured selective state information; and
a first computational hardware unit configured to execute the one or more guest machines and the virtual machine layer and coupled to the storage system, wherein the second type of analysis is a compliance check to validate that the computational system includes a desired system configuration, and wherein the first type of analysis is to:
validate kernel data structures in the kernel memory of a kernel have not been corrupted;
validate the kernel is properly configured; and
validate the kernel includes necessary components.

12. The system of claim 11, wherein the state snapshot server is configured to execute within one of the guest machines.

13. The system of claim 11, wherein the attribute of the policy comprises one of a parameter, a system characteristic, a range, or specific system-related data to be compared to at least a portion of the captured selective state information.

14. The system of claim 11, further comprising a second computational hardware unit, wherein the second computational hardware unit is configured to execute the state snapshot server.

15. The system of claim 14, wherein the storage system and the first computational hardware communicate over a storage area network.

16. The system of claim 11, wherein the system state snapshot server is configured to control the virtual machine layer to generate the selective state information upon the occurrence of at least one of a scheduled system state analysis, a change to a policy, and event triggers.

17. The system of claim 11, further comprising a configuration management server configured to communicate with the state snapshot server, wherein the configuration management server is configured to issue a configuration change ticket, and wherein in response to the issuing the configuration change ticket, the state snapshot server is configured to capture the selective state information from the at least one guest machine and analyze the captured selective state information.

18. The system of claim 17, wherein the system configuration change ticket indicates a system configuration change, and wherein the system configuration change is implemented before the state snapshot server captures the selective state information from the at least one guest machine and analyzes the captured selective state information.

19. The system of claim 17, wherein the configuration management system is configured with change process rules.

20. The system of claim 17, wherein the configuration management server uses the state analysis results in an analysis of configuration management changes.

21. The system of claim 20, wherein the configuration management ticket is modified to include at least part of the state analysis results.

22. One or more processor readable storage devices having processor readable code embodied on the processor readable devices for programming one or more processors to perform operations comprising:
specifying a scope of state information to be captured based on a selected analysis to be performed on captured state information, wherein the scope of the state information is to include at least kernel memory information if the selected analysis is a first type of analysis, wherein the scope of the state information is to exclude kernel memory information if the selected analysis is a second type of analysis, and wherein the scope of the state information is specified for one or more selected guest machines of a plurality of guest machines running on a virtual machine layer of a computational system;
controlling the virtual machine layer to capture selective state information of the one or more selected guest machines running on the virtual machine layer, wherein the selective state information is within the specified scope of state information; and
analyzing the captured selective state information according to the selected analysis, wherein the selected analysis includes a policy containing an attribute that is used to analyze a portion of the captured selective state information, wherein the second type of analysis is a compliance check to validate that the computational system includes a desired system configuration, and wherein the first type of analysis is to:
validate kernel data structures in the kernel memory of a kernel have not been corrupted;
validate the kernel is properly configured; and
validate the kernel includes necessary components.

23. The one or more processor readable storage devices of claim 22, wherein the attribute of the policy comprises one of a parameter, a system characteristic, a range, or specific system-related data to be compared to at least a portion of the captured selective state information.

24. The one or more processor readable storage devices of claim 22, the operations further comprising storing the captured selective state information within a storage system.

25. The one or more processor readable storage devices of claim 22, wherein if the first type of analysis includes a system security check, the scope of the state information is to include a combination of the kernel memory information, user memory information, and file-related information.

* * * * *